United States Patent [19]

Probst et al.

[11] Patent Number: 4,806,591

[45] Date of Patent: * Feb. 21, 1989

[54] CATIONIC SIZING AGENTS FOR PAPER

[75] Inventors: Joachim Probst; Heinz Bäumgen, both of Leverkusen; Bruno Bömer, Bergisch Gladbach; Joachim König, Odenthal; Renke Mottweiler, Leverkusen, all of Fed. Rep. of Germany

[73] Assignee: Bayer Aktiengesellschaft, Leverkusen, Fed. Rep. of Germany

[*] Notice: The portion of the term of this patent subsequent to Apr. 21, 2004 has been disclaimed.

[21] Appl. No.: 921,173

[22] Filed: Oct. 20, 1986

[30] Foreign Application Priority Data

Oct. 24, 1985 [DE] Fed. Rep. of Germany ....... 3537824

[51] Int. Cl.$^4$ .................................................. C08L 33/20
[52] U.S. Cl. ................................... 524/820; 162/168.2; 524/501; 525/385
[58] Field of Search ............... 524/501, 515, 523, 820; 525/213, 217, 385; 526/292.2, 312

[56] References Cited

U.S. PATENT DOCUMENTS

| | | | |
|---|---|---|---|
| 2,838,397 | 6/1958 | Gruntfest et al. | |
| 2,980,634 | 4/1961 | Melamed | 526/310 |
| 4,200,562 | 4/1980 | Yoshioka | 526/312 |
| 4,434,269 | 2/1984 | Probst et al. | 524/538 |
| 4,659,431 | 4/1987 | Probst et al. | 162/168.2 |

FOREIGN PATENT DOCUMENTS

| | | |
|---|---|---|
| 0150003 | 7/1985 | European Pat. Off. |
| 1073854 | 1/1960 | Fed. Rep. of Germany . |
| 2058120 | 5/1972 | Fed. Rep. of Germany . |
| 1281683 | 7/1972 | United Kingdom . |

*Primary Examiner*—Christopher Henderson
*Attorney, Agent, or Firm*—Sprung Horn Kramer & Woods

[57] ABSTRACT

Cationic sizing agents for paper, obtainable by a process in which a water-soluble cationic terpolymer compound, built up in a chemically uniform manner, of (a) 7 to 40% by weight of N,N-dimethylaminoethyl acrylate and/or methacrylate, (b) 40 to 80% by weight of styrene and (c) 4 to 50% by weight of acrylonitrile, the sum of components (a) to (c) always being 100% by weight and at least 10% of the dimethylamino groups of the terpolymer being quaternized with monoepoxides, with the exception of epihalogenohydrins, and the remainder being protonated, is dissolved in an aqueous medium and, in the presence of 10 to 70% by weight—based on the following monomer mixture—of this emulsifier, (d) 5 to 95% by weight of acrylonitrile, meth-acrylonitrile or styrene or mixtures thereof and (e) 5 to 95% by weight of acrylic acid ester and/or methacrylic acid ester with 1 to 12 C atoms in the alcohol radical—the sum of components (d) and (e) always being 100% by weight—are emulsified and the emulsion thus obtained is subjected to emulsion polymerization, initiated by free radicals, at temperatures of 20° to 150° C.

8 Claims, No Drawings

CATIONIC SIZING AGENTS FOR PAPER

The present invention relates to aqueous, colloidally disperse sizing agents for paper which have improved stability properties and a reduced tendency to foam and are based on copolymers of acrylonitrile, methacrylonitrile or styrene and acrylic acid esters or methacrylic acid esters which are polymerized in the presence of quaternized terpolymers, built up in a chemically uniform manner, of N,N-dimethylaminoethyl (meth)acrylate, styrene and acrylonitrile, as emulsifiers.

It is known (compare European Pat. No. 0,058,313) that cationic sizing agents for paper can be prepared in the form of relatively stable, colloidally disperse, usually translucent solution by polymerizing acrylonitrile or methacrylonitrile with acrylic acid esters or methacrylic acid esters in the presence of particular polymeric cationic emulsifiers in an aqueous system. These emulsifiers are quaternization products of terpolymers, built up in a chemically uniform manner, of N,N-dimethylaminoethyl (meth)acrylate, styrene and acrylonitrile with contents of basic comonomer of not more than 40% by weight. The average particle diameters of these colloidally disperse solutions are between 15 and 200 nm, preferably between 20 and 150 nm.

German Offenlegungsschrift No. 3,401,573 describes the preparation of sizing agents for paper which are likewise colloidally disperse and are particularly effective for wrapping paper, by polymerizing either mixtures of (meth)acrylonitrile, styrene and acrylic acid esters of methacrylic acid esters or mixtures of styrene and acrylic acid esters or methacrylic acid esters in the presence of the abovementioned quaternized terpolymers built up in a chemically uniform manner.

A disadvantage of these colloidally disperse sizing agents is that in practice they are frequently not completely satisfactorily stable in the presence of electrolytes and at elevated temperatures (above 60° C.) when shearing forces are applied, and they have a tendency to foam. Larger amounts of electrolytes may occur in the paper processing operation if enzymatically degraded starch is included in the sizing liquor as an additive. After degradation has taken place, the enzyme activity is stopped by addition of acid (for example sulphuric acid or hydrochloric acid); the electrolytes are then formed by the addition of a base, which neutralizes the excess acid.

Since the enzymatic degradation of starch is frequently also carried out at elevated temperatures (about 80° C. to 100° C.) and the starch solution is usually added immediately to the sizing liquor, an increase in temperature of the sizing liquor to temperatures of not more than 80° C. is in general to be expected. Under these extreme conditions, the colloidally disperse sizing agents described above partly or completely agglomerate and coagulate; deposits are formed on the paper machine and the sizing effect is drastically reduced. Shearing forces, which likewise may occur during paper processing, lead to similar effects. Another disadvantage of the sizing agents described above is, in some cases, a tendency to foam beyond the normal degree, which can likewise lead to trouble in the paper processing operation.

It has now been found, surprisingly, that colloidally disperse sizing agents for paper which are stable towards electrolytes, shearing forces and heat and have little tendency to foam are obtained by polymerizing mixtures of (meth)acrylonitrile and/or styrene and acrylic acid ester or methacrylic acid ester in the presence of terpolymers, built up in a chemically uniform manner, of dimethylaminoethyl (meth)acrylate, styrene and acrylonitrile which have been quaternized with monoepoxides.

The sizing agent for paper, according to the invention, is obtained as a colloidally disperse solution with average particle diameters of 15 to 200 nm by a process in which a water-soluble cationic terpolymer compound, built up in a chemically uniform manner, of (a) 7 to 40, preferably 8 to 30% by weight of N,N-dimethylaminoethyl acrylate and/or methacrylate, (b) 40 to 80% by weight of styrene and (c) 4 to 50, preferably 5 to 40% by weight of acrylonitrile, the sum of components (a) to (c) always being 100% by weight and at least 10% of the dimethylamino groups of the terpolymer being quaternized with monoepoxides, with the exception of epihalogenohydrins, and the remainder being protonated, is dissolved in an aqueous medium, and, in the presence of 10 to 70% by weight—based on the following monomer mixture—of this emulsifier, (d) 5 to 95, preferably 20 to 80% by weight of acrylonitrile, methacrylonitrile or styrene or mixtures thereof and (e) 5 to 95, preferably 20 to 80% by weight of acrylic acid ester and/or methacrylic acid ester with 1 to 12 C atoms in the alcohol radical—the sum of components (d) and (e) always being 100% by weight—are emulsified, and the emulsion thus obtained is subjected to emulsion polymerization, initiated by free radicals, at temperatures of 20° to 150° C.

The weight ratio between the polymeric, cationic emulsifier and monomer mixture of (d) and (e) is preferably 1:4 to 1:1.

The sizing agent for paper, according to the invention, is also obtained when, in addition to the cationic emulsifier mentioned, a cationic and/or non-ionic auxiliary emulsifier is employed in amounts of 1 to 40% by weight, preferably 3 to 20% by weight, based on the above cationic emulsifier, the non-ionic emulsifier having the formula

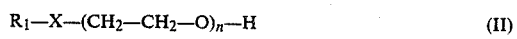

wherein

X denotes O, NH or COO, $R_1$ is a higher aliphatic, cycloaliphatic, araliphatic or aromatic hydrocarbon radical with 6-30 C atoms and n is an integer $\geq 2$, and the cationic auxiliary emulsifier having the formula

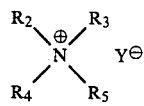

wherein $R_2$ and $R_3$ represent higher aliphatic or araliphatic hydrocarbon radicals with 6 to 20 C atoms, $R_4$ and $R_5$ represent lower aliphatic hydrocarbon radicals with 1 to 6 C atoms and $Y^-$ represents a halide ion.

The terpolymer, built up in a chemically uniform manner, of N,N-dimethylaminoethyl (meth)acrylate, styrene and acrylonitrile is quaternized in an organic medium, after partial or complete neutralization with acid, with monoepoxides of the general formula

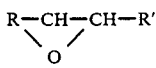

wherein
R and R' represent identical or different radicals and denote hydrogen, an alkyl group with 1 to 16 carbon atoms, a cycloalkyl group with 5 to 12 carbon atoms or an aryl group with 6 to 12 carbon atoms, it being possible for the substituents mentioned also to contain hetero atoms or functional substituents, in particular hydroxyl substituents, but excluding epihalogenohydrins. Examples of monoepoxides which are particularly suitable are ethylene oxide, propylene oxide, 1,2-butylene oxide, 2,3-butylene oxide, isobutylene oxide, 1,2-epoxyhexane, 1,2-epoxydecane, 1,2-epoxydodecane, styrene oxide, cyclohexane oxide and glycidyl alcohol. The hydrophilic-hydrophobic properties of the polymeric cationic emulsifier can be influenced within wide limits both via the nature of the epoxide and via the degree of quaternization.

The quaternization of homo- or copolymers containing dialkylamino groups with ethylene oxide, propylene oxide or styrene oxide is known from French Patent Specification No. 1,173,575 and British Patent Specification No. 1,281,683 and from German Offenlegungsschrift No. 2,258,868. However, monoepoxides with longer alkyl chains are not claimed. Furthermore, nothing is reported of a use of such products as sizing agents for paper which are stable towards electrolytes, heat and shearing forces and have favourable foaming properties.

After the quaternization, the remaining acid is added and the components are dissolved to form aqueous solutions with a concentration of 10 to 30% by weight, preferably 15 to 25% by weight. The emulsifier solutions thus obtained can now also be freed from the organic solvent by distillation; however, the removal of the organic solvent is not necessary, since the solvent in general does not interfere with the emulsion polymerization in the subsequent course of the reaction.

For the emulsification, it is sufficient for the quaternized cationic terpolymers to be employed for the emulsion polymerization without further additives. In some cases, however, it proves to be quite advantageous for oligomeric non-ionic and/or low molecular weight cationic auxiliary emulsifiers to be employed together with the polymeric cationic emulsifier in proportions of 1 to 40% by weight, preferably 3 to 20% by weight, based on the cationic emulsifier.

Suitable non-ionic auxiliary emulsifiers are reaction products of aliphatic, araliphatic, cycloaliphatic or aromatic carboxylic acids, alcohols, phenol derivatives or amines with epoxides, such as, for example, ethylene oxide.

Examples of these are reaction products of ethylene oxide with carboxylic acids, such as, for example, lauric acid, stearic acid, oleic acid, the carboxylic acids of castor oil or abietic acid, with longer chain alcohols, such as oleyl alcohol, lauryl alcohol or stearyl alcohol, with phenol derivatives, such as, for example, substituted benzyl- or phenylphenols or nonylphenol and with longer chain amines, such as, for example, dodecylamine and stearylamine. The reaction products with ethylene oxide are oligo- or polyethers with degrees of polymerization of between 2 and 100, preferably from 5 to 50.

Suitable cationic low molecular weight auxiliary emulsifiers are quaternized ammonium salts, such as, for example, benzyldodecyl-dimethyl-ammonium chloride. The auxiliary emulsifiers mentioned effect additional emulsification of the monomer mixture and in some cases increase the stability of the colloidally disperse sizing agents. However, it is not advisable to use too high an amount of these auxiliary dispersing agents, since undesirable foaming can otherwise readily occur.

Suitable acrylic acid esters or methacrylic acid esters which are employed as comonomers in the free radical emulsion copolymerization are preferably those compounds which form copolymers with film-forming temperatures below 100° C. with (meth)acrylonitrile or styrene or mixtures thereof.

Copolymers which, because of the position of their glass transition point, have higher film-forming temperatures possess only an inadequate sizing action. Compounds which are suitable in principle are acrylates, such as methyl, ethyl, n-butyl and 2-ethylhexyl acrylate, and methacrylates, such as methyl methacrylate and n-butyl methacrylate. They can be copolymerized individually or as a mixture with methacrylonitrile, acrylonitrile or styrene or with mixtures of the two comonomers last mentioned or with mixtures of all three monomers. The content of styrene, acrylonitrile or methacrylonitrile or mixtures of these components can be between 5 and 95, preferably 20 and 80% by weight. Formulations containing too little styrene, acrylonitrile or methacrylonitrile in the copolymer may cause trouble during paper production because of their tackiness, and sizing of the paper is inadequate with formulations with a very large amount of styrene, acrylonitrile or methacrylonitrile.

Possible initiators for the emulsion polymerization are, preferably, water-soluble non-ionic peroxides which supply free radicals, such as hydrogen peroxide and t-butyl hydroperoxide, as well as water-soluble azo compounds, such as are described, for example, in German Offenlegungsschrift No. 2,841,045. Redox systems which consist of peroxidic initiators and reducing agents, such as amines, polyamines, thiourea, iron-II salts and the like, are furthermore suitable. Possible initiators are also water-insoluble initiators, such as azoisobutyronitrile and benzoyl peroxide. The latter are then dissolved virtually only in the organic phase. The initiators mentioned are added in amounts of 0.1 to 5% by weight, preferably 0.3 to 3.0% by weight, based on the monomer mixture.

Customary chain regulators, for example n-dodecylmercaptan, t-dodecylmercaptan, diisopropylxanthogene disulphide, thioglycol and thioglycerol, can also be employed to regulate the molecular weights of the polymers. They are added in amounts of 0.1 to 2% by weight, based on the monomer mixture.

The emulsion polymerization in an aqueous medium can be carried out by known polymerization processes, either discontinuously or continuously or by the feed process. The continuous process and the feed process are particularly preferred. In the latter, water, together with some or all of the emulsifier system and, if appropriate, some of the monomer mixture, is taken under a nitrogen atmosphere and is heated to the polymerization temperature of 20° to 150° C., preferably 50° to 100° C., and the monomer mixture and initiator and, if appropriate, emulsifier are added dropwise in the course of 0.5 to 10 hours, preferably 1 to 6 hours. At some time, the mixture is post-activated and the reaction is brought to completion up to a conversion of about 99.0% to 99.9%. The weight ratio of emulsifier to polymer here is 1:9 to 7:3, preferably 1:4 to 1:1. Residual monomers and any organic solvent still present are removed by distillation in vacuo after the emulsion copolymerization. Water is then added until an approximately 10 to 35% strength by weight aqueous colloidally disperse solution results. The viscosity of these dispersions, measured in a rotary viscometer at 20° C., is in general below 50 mPa.s. The average particle diameters, measured by means of laser scattered light spectroscopy, are between 15 and 200 nm, preferably between 20 and 150 nm, depending on the reaction conditions. Dispersions with particle sizes below 50 nm appear transparent, whilst those with larger particles appear more cloudy. The stability of the dispersions with particle sizes below 100 nm is also better than that of those with particle sizes above 100 nm, which can be demonstrated, for example, by exposure to heat at temperatures above 80° C. The content of sediments is usually considerably higher in dispersions with coarser particles than in fine-particled dispersions.

The stability of the colloidally disperse sizing agents according to the invention is also increased by grafted-on portions of the polymer on the polymeric emulsifier present in relatively large amounts. Such grafting reactions, which are triggered off by transfer reactions by the emulsifier, are known in the literature (compare H. Gerrens, Fortschritte der Hochpolymer-Forschung (Advances in High Polymer Research), Volume I, (1959) page 300). The sizing agents for paper according to the invention can be used in all the working methods customary in papermaking for surface and beater sizing.

In addition to the substantial pH independence of their sizing effect and the generally very high degree of sizing industrially, the improved stability towards electrolytes, shearing forces and heat and the reduced tendency to foam in comparison with the sizing agents for paper in European Pat. No. 0,058,313 and German Offenlegungsschrift No. 3,401,573 should be emphasized again, and are illustrated in the following examples.

EXAMPLE 1

Preparation of the cationic emulsifiers 5,720 g of isopropanol are taken in a 40 liter autoclave. The autoclave is flushed thoroughly with nitrogen and then warmed to 80° C. Mixtures I and solutions II of Table I are metered in at this temperature in the course of 4 hours, with exclusion of air. The mixture is then subsequently stirred for 1 to 2 hours and thereafter post-activated with solution III. The mixture is then stirred at 80° C. for about 6 to 12 hours. After the terpolymerization, the amount of acetic acid (IV) stated in Table I is metered into the polymer at an unchanged temperature. The monoepoxide (V) is subsequently metered in as the quaternizing agent in the course of about 15 minutes and the mixture is stirred for about 1 hour. Thereafter, the remainder of the acetic acid (VI) is added. About 63–65 liters of deionized water at a temperature of about 60° C. are taken in a 120 liter stock vessel equipped with a stirrer, and the contents of the 40 liter autoclave are combined with this. A homogeneous aqueous solution is prepared in a short time by stirring intensively. The aqueous solutions, which also contain organic solvent, have the properties likewise recorded in Table I.

TABLE I

| | | Emulsifier | | | | |
|---|---|---|---|---|---|---|
| | | A | B | C | D | E |
| | Polymerization and quaternization temperature (°C.) | 80 | 80 | 80 | 80 | 80 |
| I. | N,N—dimethylaminoethyl methacrylate (g) | 3217 | 3217 | 2257 | 3217 | 3217 |
| | styrene (g) | 10244 | 10244 | 10608 | 10244 | 10244 |
| | acrylonitrile (g) | 2644 | 2644 | 3219 | 2644 | 2644 |
| II. | Azoisobutyronitrile (g) | 500 | 500 | 550 | 500 | 500 |
| | acetone (g) | 3000 | 3000 | 3000 | 3000 | 3000 |
| III. | Azoisobutyronitrile (g) | 50 | 50 | 50 | 50 | 50 |
| | acetone (g) | 300 | 300 | 300 | 300 | 300 |
| IV. | acetic acid (g) | 1229 | 984 | 690 | 984 | 984 |
| V. | 1,2-epoxydodecane (g) | 1131 | — | — | — | — |
| | 1,2-epoxyhexane (g) | — | 1025 | 719 | — | — |
| | 1,2-epoxybutane (g) | — | — | — | 885 | — |
| | propylene oxide (g) | — | — | — | — | 891 |
| VI. | Acetic acid (g) | 1230 | 1475 | 1035 | 1475 | 1475 |
| | Concentration (%) | 20.3 | 20.1 | 20.2 | 20.0 | 19.9 |
| | Viscosity (at 20° C.) [mPa.s]* | 50–100 | 30–70 | 300–500 | 20–50 | 20–50 |
| | pH value: | 4.2 | 4.2 | 4.1 | 4.2 | 4.2 |
| | Appearance of the emulsifier solution: | slightly cloudy | clear | clear | clear | clear |

*Viscosity is not constant since the samples have structural viscosity

EXAMPLES 2 TO 4

9,720 g of deionized water are taken in a 40 liter stirred autoclave. The water is then boiled up thoroughly under a nitrogen atmosphere and cooled to 70° C. Thereafter, the emulsions I (compare Table I) are added to the initial water, with exclusion of air. 12 g of a 35% strength hydrogen peroxide solution are then added. After about 15–30 minutes, the monomer mixtures II and the initiator mixtures III are metered in over a period of about 4 hours. Thereafter, the mixture is subsequently stirred for a further 2 to 5 hours and is then post-activated with mixture IV and after-polymerized for about a further 2 to 10 hours. About 1.5 to 2 liters of a mixture of water, organic solvent (isopropanol and acetone) and residual monomers are then distilled off under a waterpump vaccum of about 200 to 400 mbar and are replaced by the same amount of deionized water. The physicochemical properties of the colloidally disperse solutions thus obtained are likewise recorded in Table II.

TABLE II

| | | Example | | |
|---|---|---|---|---|
| | | 2 | 3 | 4 |
| I. | Emulsifier A (compare Table I) (g) | 12400 | 12400 | 12400 |
| | Styrene (g) | 124 | — | — |
| | Acrylonitrile (g) | — | 124 | — |
| | Methacrylonitrile (g) | — | — | 124 |
| | n-Butyl acrylate (g) | 124 | 124 | 124 |
| II. | Styrene (g) | 2356 | — | — |
| | Acrylonitrile (g) | — | 2356 | — |
| | Methacrylonitrile (g) | — | — | 2356 |
| | n-Butyl acrylate (g) | 2356 | 2356 | 2356 |
| III. | Hydrogen peroxide (35% strength) (g) | 198 | 198 | 198 |
| | Deionized water (g) | 2480 | 2480 | 2480 |
| IV. | Hydrogen peroxide (35% strength) (g) | 25 | 25 | 50 |
| | Deionized water (g) | 100 | 100 | 100 |
| | Concentration (% by weight) | 24.8 | 25.0 | 24.9 |
| | Viscosity (at 23° C.) [mPa.s] | <50 | <50 | <50 |
| | pH value | 4.3 | 4.4 | 4.3 |
| | Appearance of the colloidally disperse solution | slightly cloudy | slightly cloudy | slightly cloudy |
| | Average particle diameter $d_z$ [nm] | 67 | 48 | 52 |

EXAMPLES 5 AND 6

The colloidally disperse sizing agents 5 and 6 are prepared in the same way as the corresponding sizing agents 2 and 3, but emulsifier A is replaced by emulsifier B (compare Table I).

TABLE III

| | | Example | |
|---|---|---|---|
| | | 5 | 6 |
| I. | Emulsifier B (compare Table I) (g) | 12400 | 12400 |
| | Styrene (g) | 124 | — |
| | Acrylonitrile (g) | — | 124 |
| | n-Butyl acrylate (g) | 124 | 124 |
| II. | Styrene (g) | 2356 | — |
| | Acrylonitrile (g) | — | 2356 |
| | n-Butyl acrylate (g) | 2356 | 2356 |
| | Concentration (% by weight) | 24.7 | 24.6 |
| | Viscosity (at 23° C.) [mPa.s] | <50 | <50 |
| | pH value | 4.2 | 4.3 |
| | Appearance of the colloidally disperse solution | transparent | transparent |
| | Average particle diameter $d_z$ [nm] | 39 | 35 |

EXAMPLES 7 AND 8

The colloidally disperse sizing agents 7 and 8 are prepared in the same way as the corresponding sizing agents 2 and 3, but emulsifier A is replaced by emulsifier C (compare Table I).

TABLE IV

| | | Example | |
|---|---|---|---|
| | | 7 | 8 |
| I. | Emulsifier C (compare Table I) (g) | 12400 | 12400 |
| | Styrene (g) | 124 | — |
| | Acrylonitrile (g) | — | 124 |
| | n-Butyl acrylate (g) | 124 | 124 |
| II. | Styrene (g) | 2356 | — |
| | Acrylonitrile (g) | — | 2356 |

TABLE IV-continued

| | | Example | |
|---|---|---|---|
| | | 7 | 8 |
| | n-Butyl acrylate (g) | 2356 | 2356 |
| | Concentration (% by weight) | 25.2 | 25.1 |
| | Viscosity (at 23° C.) [mPa.s] | <50 | <50 |
| | Appearance of the colloidally disperse solution | transparent | transparent |
| | Average particle diameter $d_z$ [nm] | 45 | 37 |

EXAMPLES 9 AND 10

The colloidally disperse sizing agents 9 and 10 are prepared in the same way as the corresponding sizing agents 2 and 3, but emulsifier A is replaced by emulsifier D (compare Table I).

TABLE V

| | | Example | |
|---|---|---|---|
| | | 9 | 10 |
| I. | Emulsifier D (compare Table I) (g) | 12400 | 12400 |
| | Styrene (g) | 124 | — |
| | Acrylonitrile (g) | — | 124 |
| | n-Butyl acrylate (g) | 124 | 124 |
| II. | Styrene (g) | 2356 | — |
| | Acrylonitrile (g) | — | 2356 |
| | n-Butyl acrylate (g) | 2356 | 2356 |
| | Concentration (% by weight) | 25.3 | 25.1 |
| | Viscosity (at 23° C.) [mPa.s] | <50 | <50 |
| | Appearance of the colloidally disperse solution | transparent | transparent |
| | Average particle diameter $d_z$ (nm) | 48 | 43 |

EXAMPLES 11 AND 12

The colloidally disperse sizing agents 11 and 12 are prepared in the same way as the corresponding sizing agents 2 and 3, but emulsifier A is replaced by emulsifier E (compare Table I).

TABLE VI

| | | Example | |
|---|---|---|---|
| | | 11 | 12 |
| I. | Emulsifier E (compare Table I) (g) | 12400 | 12400 |
| | Styrene (g) | 124 | — |
| | Acrylonitrile (g) | — | 124 |
| | n-Butyl acrylate (g) | 124 | 124 |
| II. | Styrene (g) | 2356 | — |
| | Acrylonitrile (g) | — | 2356 |
| | n-Butyl acrylate (g) | 2356 | 2356 |
| | Concentration (% by weight) | 25.4 | 24.8 |
| | Viscosity (at 23° C.) (mPa.s) | <50 | <50 |
| | Appearance of the colloidally disperse solution | transparent | transparent |
| | Average particle diameter $d_z$ [nm] | 32 | 28 |

A solution of 5% by weight of starch (Perfectamyl ® A 4692 from AVEBE), 0.4% by weight of sodium sulphate and 0.20 or 0.25% by weight of the sizing agent to be tested (calculated as the active substance) in 94.40 or 94.35% by weight of water is used as the sizing liquor for surface sizing. Before use in the sizing press, the sizing liquors are warmed at 75° C. in a waterbath for 30 minutes. A laboratory sizing press from Werner Mathis, Zurich, type HF is used for the sizing. The sizing liquor has a temperature of about 25° C. in the sizing press. The paper is drawn through at a speed of 4 m/minute.

The surface-sized paper is dried on a drying cylinder in the course of about 45 seconds at about 100° C. Before testing the sizing, the paper is acclimatized at room temperature for 2 hours. The sizing is tested in accordance with DIN 53 132. In this, the water uptake in g/m² is determined after a testing time of 60 seconds (Cobb$_{60}$).

USE EXAMPLE 1

This example demonstrates the good activity of some sizing agents after exposure to heat and electrolytes on paper free from aluminium sulphate. The base paper used has the following composition and properties: 50% by weight of conifer cellulose, 50% by weight of hardwood cellulose and 9.5% by weight of clay ash, pH in the headbox: 7.5; wet uptake in the laboratory sizing press: about 80% by weight, paper weight: 80 g/m².

Two sizing agents according to European Pat. No. 0,058,313 (sizing agents 3 and 10)—called here M and N—were used as the comparison substance.

TABLE VII

| Surface sizing on paper free from aluminium sulphate after exposure to heat and electrolytes. | | |
|---|---|---|
| | Water uptake in g/m² on addition of | |
| Sizing agent from Example | 0.20% by weight of sizing agent (based on the pure active substance) to the liquor | 0.25% by weight |
| 3 | 37.8 | 35.3 |
| 5 | 35.3 | 33.1 |
| 6 | 34.1 | 32.4 |
| 8 | 35.2 | 33.5 |
| 10 | 34.7 | 32.3 |
| 11 | 35.8 | 33.6 |
| 12 | 33.2 | 31.3 |
| M | 45.2 | 40.5 |
| N | 65.5 | 61.3 |

Without a sizing agent, the water uptake is 89.0 g/m².

USE EXAMPLE 2

This example demonstrates the low tendency of the sizing agents according to the invention to foam in comparison with sizing agents M and N according to European Pat. No. 0,058,313. The tendency to foam is, in this example, measured in the absence of additives such as, for example, additional emulsifiers and antifoaming agents.

In this example 0.4% by weight of active compound is dissolved in a sizing liquor of 5% by weight of commercially available starch (Perfectamyl A 4692 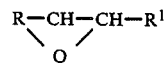) and the solution is warmed to 60° C. 200 ml of this sizing liquor are passed from an aluminium vessel, which has a circular opening 4 mm in diameter (Ford cup) on its underside, from a height of 60 cm into a graduated glass beaker under gravity. The volume (in ml) of the foam which forms over the surface of the liquid is determined once immediately and also after standing in air for one minute. The first value gives information on the tendency of the sizing agent to foam, and the second value gives information on the speed at which the foam is degraded and the stability of the foam.

TABLE VIII

| Tendency of sizing agents to foam | | |
|---|---|---|
| Sizing agent from Example | Foam volume in ml | |
| | immediately | after 1 minute |
| 5 | 20 | 0 |
| 6 | 15 | 0 |
| 8 | 25 | 0 |

TABLE VIII-continued

| Tendency of sizing agents to foam | | |
|---|---|---|
| Sizing agent from Example | Foam volume in ml | |
| | immediately | after 1 minute |
| 11 | 15 | 0 |
| 12 | 15 | 0 |
| M | 100 | 50 |
| N | 70 | 30 |

We claim:

1. Cationic sizing agents for paper, obtainable by a process in which a water-soluble cationic terpolymer compound, built up in a chemically uniform manner, of (a) 7 to 40% by weight of N,N-dimethylaminoethyl acrylate and/or methacrylate, (b) 40 to 80% by weight of styrene and (c) 4 to 50% by weight of acrylonitrile, the sum of components (a) to (c) always being 100% by weight and at least 10% of the dimethylamino groups of the terpolymer being quaternized with monoepoxides of the formula $$R-CH-CH-R^1 \atop \diagdown O \diagup$$

wherein

R and R$^1$ represent identical or different radicals and denote hydrogen, an alkyl group with 1 to 16 carbon atoms, a cycloalkyl group with 5 to 12 carbon atoms or an aryl group with 6 to 12 carbon atoms, with the exception of epihalogenohydrins, and the remainder protonated, is dissolved in an aqueous medium and, in the presence of 10 to 70% by weight—based on the following monomer mixture—of this emulsifier, (d) 5 to 95% by weight of acrylonitrile, methacrylonitrile or styrene or mixtures thereof and (e) 5 to 95% by weight of acrylic acid ester and/or methacrylic acid ester with 1 to 12 C atoms in the alcohol radical—the sum of components (d) and (e) always being 100% by weight—are emulsified and the emulsion thus obtained is subjected to emulsion polymerization, initiated by free radicals, at temperatures of 20° to 150° C.

2. Sizing agents for paper according to claim 1, characterized in that the cationic terpolymer compound, built up in a chemically uniform manner, consists of (a) 8 to 30% by weight of N,N-dimethylaminoethyl acrylate and/or methacrylate, (b) 40 to 80% by weight of styrene and (c) 5 to 40% by weight of acrylonitrile, the sum of components (a) to (c) always being 100% by weight.

3. Sizing agents for paper according to claim 1, characterized in that the monomer mixture consists of (d) 20 to 80% by weight of acrylonitrile, methacrylonitrile or styrene or mixtures thereof and (e) 20 to 80% by weight of acrylic acid ester and/or methacrylic acid ester with 1 to 12 C atoms in the alcohol radical, the sum of components (d) and (e) being 100% by weight.

4. Sizing agents for paper according to claim 1, characterized in that, in addition to the polymeric cationic emulsifier according to claim 1, a cationic and/or non-ionic auxiliary emulsifier is employed in amounts of 1 to 40% by weight, based on the above cationic emulsifier, the non-ionic emulsifier having the formula $$R_1-X-(CH_2-CH_2-O)_n-H \qquad (II)$$

wherein

X denotes O, NH or COO, $R_1$ is a higher aliphatic, cycloaliphatic, araliphatic or aromatic hydrocarbon radical with 6–30 C atoms and n is an integer $\geq 2$, and the cationic auxiliary emulsifier having the formula

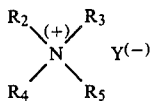

wherein $R_2$ and $R_3$ represent higher aliphatic or araliphatic hydrocarbon radicals with 6 to 20 C atoms, $R_4$ and $R_5$ represent lower aliphatic hydrocarbon radicals with 1 to 6 C atoms and $Y^-$ represents a halide ion.

5. Sizing agents according to claim 1, characterized in that the weight ratio between the poly-meric cationic emulsifier and monomer mixture of (d) and (e) is 1:4 to 1:1.

6. Sizing agents according to claim 1, characterized in that the emulsion polymerization is initiated with water-soluble non-ionic peroxides and/or azo compounds which supply free radicals, if appropriate as a redox system, in amounts of 0.1 to 5% by weight, based on the monomer mixture.

7. Sizing agents according to claim 1, characterized in that they are in the form of colloidally disperse solutions with average particle diameters of 15–200 nm.

8. Sizing agents according to claim 1, characterized in that the terpolymer, built up in a chemically uniform manner, of N,N-dimethylaminoethyl (meth)acrylate, styrene and acrylonitrile is quaternized with monoepoxides in an organic medium, after partial or complete neutralization with acid.

* * * * *